United States Patent
Jangid et al.

(10) Patent No.: US 11,844,139 B2
(45) Date of Patent: *Dec. 12, 2023

(54) APPARATUS AND METHOD FOR MANAGING RADIO RESOURCE IN WIRELESS COMMUNICATION SYSTEM

(71) Applicant: Samsung Electronics Co., Ltd., Suwon-si (KR)

(72) Inventors: Alok Kumar Jangid, Bangalore (IN); Kailash Kumar Jha, Bangalore (IN); Krishnamurthy Doddaballapur Ramu, Bangalore (IN); Lalith Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

This patent is subject to a terminal disclaimer.

(21) Appl. No.: 17/406,908

(22) Filed: Aug. 19, 2021

(65) Prior Publication Data
US 2021/0385902 A1 Dec. 9, 2021

Related U.S. Application Data

(63) Continuation of application No. 16/858,179, filed on Apr. 24, 2020, now Pat. No. 11,102,841, which is a (Continued)

(30) Foreign Application Priority Data

May 14, 2015 (IN) .......................... 2443/CHE/2015
Apr. 26, 2016 (IN) ......................... 2443/CHE/ 2015

(51) Int. Cl.
*H04W 76/32* (2018.01)
*H04W 76/30* (2018.01)
(Continued)

(52) U.S. Cl.
CPC .......... *H04W 76/32* (2018.02); *H04W 76/30* (2018.02); *H04W 28/02* (2013.01); *H04W 60/04* (2013.01); *H04W 88/02* (2013.01)

(58) Field of Classification Search
CPC ..... H04W 76/32; H04W 76/30; H04W 88/02; H04W 28/02; H04W 60/04
See application file for complete search history.

(56) References Cited

U.S. PATENT DOCUMENTS

2011/0103277 A1* 5/2011 Watfa ................ H04W 36/0033
370/310
2012/0300750 A1* 11/2012 Chin ................. H04W 36/0022
370/331
(Continued)

FOREIGN PATENT DOCUMENTS

CN 103546985 A 1/2014

OTHER PUBLICATIONS

Mediatex Inc, et al., "Correction to UE Initiated Release of Bearer Resources," C1-154869, 3GPP TSG-CT1 Meeting #95, Anaheim California, Nov. 16-20, 2015, 2 pages.

*Primary Examiner* — Walter J Divito
*Assistant Examiner* — Anthony Luo (57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Embodiments herein provide a method implemented in a User Equipment (UE). The method includes receiving, from a Mobility Management Entity (MME), a bearer resource modification reject message with a cause value, in response to a bearer resource modification request message sent to the MME. Further, the method includes deactivating an Evolved Packet System (EPS) bearer context information.

14 Claims, 7 Drawing Sheets

Related U.S. Application Data continuation of application No. 15/154,878, filed on May 13, 2016, now Pat. No. 10,638,537.

(51) Int. Cl.
*H04W 28/02* (2009.01)
*H04W 60/04* (2009.01)
*H04W 88/02* (2009.01)

(56) References Cited

U.S. PATENT DOCUMENTS

| | | |
|---|---|---|
| 2013/0308527 A1 | 11/2013 | Chin et al. |
| 2015/0245249 A1 | 8/2015 | Grootwassink et al. |
| 2016/0227469 A1 | 8/2016 | Kim et al. |

\* cited by examiner

APPARATUS AND METHOD FOR MANAGING RADIO RESOURCE IN WIRELESS COMMUNICATION SYSTEM

CROSS-REFERENCE TO RELATED APPLICATIONS

This application is a continuation of application Ser. No. 16/858,179, filed Apr. 24, 2020, which is a continuation of application Ser. No. 15/154,878, filed May 13, 2016, now U.S. Pat. No. 10,638,537, which claims priority under 35 U.S.C. § 119(a) to an Indian Provisional Patent Application No. 2443/CHE/2015, filed on May 14, 2015, and Indian Complete Patent Application No. 2443/CHE/2015, filed on Apr. 26, 2016, the entire contents of each of which are incorporated herein by reference.

BACKGROUND

1. Field

The subject matter of the present disclosure relates to wireless communication, and more particularly to apparatus and method for managing radio resource in wireless communication system.

2. Description of Related Art

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The introduction of Internet Protocol (IP) Multimedia Subsystem (IMS) has resulted in the increased usage of dedicated bearers, especially for voice calls and video calls. The frequent establishment and release of the bearers also accompanies with the modification, addition, or deletion of packet filters. These results in increased possibility of packet filter content conflicts in a User Equipment (UE) side. The 3rd Generation Partnership Project (3GPP) specification 24.301 describes about the scenario of packet filter mismatch or overlap (precedence, filter Identification (ID), or the like) and in such mismatch cases, the UE should accept the filters on a new bearer and delete the conflicting filters of the old bearer. The latter has to be updated to a network through a bearer resource modification request.

Further, the 3GPP specification states that the UE synchronizes the bearers with the network, after any local changes in the packet filters, through the bearer resource modification request. But, the specification does not describe the UE actions in case the bearer resource modification request is rejected by the network.

In response to the bearer resource modification request, the failure of the "Bearer Resource Modification" via "Bearer Resource Modification Reject" or "Evolved Packet System (EPS) Status" message from the network results in the bearer still being active on the UE side. Since the packet filters were deleted on the UE side (most of the times, all the filters related to the bearer), the bearer is no longer used to transmit any packets in the UE side. Since the bearer is still active in the UE side, the IMS client in UE continues to transmit data related to the bearer, which is in-turn not sent from a modem, due to deletion of the packet filter. The other possibility is that even if the packets are sent on the default bearer, the same will be dropped at a Primary Gateway (P-GW). This continues, till the release of the specific bearer by the network.

Further, if the UE transmit the Bearer Resource Modification Request to the network in order to release all the resources in the bearer, the network would normally respond by initiating a deactivation procedure for the context, but the network transmits Bearer Resource Modification Reject with cause value #31. The 3GPP specification does not specify what would be the correct UE action in such a case which means after the rejection the UE may have a useless EPS bearer context that cannot be released. This will lead to various problems in the UE such as data stall with respect to the bearer for which the UE has deleted all Traffic Flow Template (TFT) packet filters. If the bearer is related to audio call it will lead to call mute issue. If the bearer is related to the video call then the screen will be blank, or the like which degrades the user experience.

Consider a scenario: if a user of the UE initiates a Voice over Long Term Evolution (VoLTE) audio call, the network assigns the dedicated bearer for the audio which includes packet filters for the audio. Then UE upgrades the audio call to a video call. After upgrading the audio call to the video call, the network assigns dedicated bearer for the video which includes the packet filter for the video. Due to some changes on the network side, the network transmits a bearer resource modification request message for the audio bearer (includes new set of packet filters for the audio) to the UE. However, the packets received as part of bearer resource modification request message for the audio bearer has conflict (i.e., packet filter mismatch) with existing packet filters assigned for the video bearer. In such case, as per 3GPP specification, the UE accepts newly received packet filters and deletes the existing packet filters of the video bearer. The UE informs the same to the network through the bearer resource modification request with an OP CODE set as DELETE for the video bearer. If the network rejects the bearer resource modification request, the video bearer will not receive any data and video will be stuck since the packets filters for the video bearer has been deleted at the UE side. In such case, the video bearer will neither receive the video data nor is it released on the UE.

Consider another scenario: if the user of the UE initiates a VoLTE audio call. The network assigns the dedicated bearer for the audio which includes packet filters for the audio. The UE upgrades the audio call to the video call. The network assigns the dedicated bearer for the video which includes the packet filter for the video. Due to some changes on the network side, the network transmits the bearer resource modification request for the video bearer which includes new set of packet filters for the video. However, the packets received as part of bearer resource modification request for the video bearer has conflict (i.e., packet filter mismatch) with existing packet filters assigned for the audio bearer. In such case, as per 3GPP specification, the UE accepts the newly received packet filters and deletes the existing packet filters of the audio bearer. The UE informs the same to the network through the bearer resource modification request with the OP CODE set as DELETE for the audio bearer. The packet filter of the audio bearer is deleted at the UE. The deleted audio bearer information is not updated to the network as the network transmits the bearer resource modification reject message to the UE. Since the packet filters are deleted, the audio bearer will not receive any data and audio will be mute.

Consider another scenario: an Application "A" requests required Quality of Service (QoS) and the network assigns dedicated bearer for the Application "A". Application "B" also requests required QoS, and the network assigns the dedicated bearer for the Application "B". Due to some changes on the network side, the network transmits the bearer resource modification request for the Application "B" which includes new set of packet filters for the Application "A". However, the packets received as part of the bearer resource modification request for the Application "A" have conflict (i.e., packet filter mismatch) with the existing packet filters assigned for the application "A". In such case, as per 3GPP specification, the UE accepts newly received packet filters and deletes the existing packet filters of the Application "A". The UE informs the same to the network through the bearer resource modification request with OP CODE set as DELETE for the audio bearer. If the network transmits the bearer resource modification reject message to the UE, the packet filter of Application "A" Bearer is deleted at the UE. The deleted packet filter is not updated to the network as the network sent the bearer resource modification reject to the UE. Thus, the Application "A" bearer will not receive any data and data stall will be observed for the Application "A".

The above information is presented as background information only to help the reader to understand the present disclosure. Applicants have made no determination and make no assertion as to whether any of the above might be applicable as Prior Art with regard to the present application.

SUMMARY

To address the above-discussed deficiencies, it is a primary object to provide a method an apparatus implemented by a User Equipment (UE) to deactivate an Evolved Packet System (EPS) bearer context locally when a bearer resource modification reject message is received from a Network.

Another object of the embodiments herein is to provide a method and an apparatus for transmitting a Tracking Area Update (TAU) request message with EPS bearer context status to a network to synchronize the EPS bearer context with the network.

Embodiments herein disclose a method implemented in a User Equipment (UE). The method includes receiving, from a mobility management entity (MME), a bearer resource modification reject message with a cause value, in response to a bearer resource modification request message sent to the MME. The method further includes deactivating an evolved packet system (EPS) bearer context information based on the cause value.

The method further includes transmitting a Tracking Area Update (TAU) request message with EPS bearer context status to the MME to synchronize the EPS bearer context with the MME.

The cause value refers to an EPS Session Management (ESM) cause value indicating "request rejected, unspecified".

Embodiments herein disclose a User Equipment (UE) apparatus. The apparatus includes is configured to receive, from a mobility management entity (MME), a bearer resource modification reject message with a cause value, in response to a bearer resource modification request message sent to the MME. The UE is further configured to deactivate an evolved packet system (EPS) bearer context information based on the cause value.

Embodiments herein disclose a method implemented in a MME. The method includes generating a bearer resource modification reject message with a cause value, in response to a bearer resource modification request message received from the UE; and transmitting, to the UE, the bearer resource modification reject message with the cause value, wherein an evolved packet system (EPS) bearer context information is deactivated based on the cause value.

Embodiments herein disclose an apparatus implemented in a MME. The apparatus includes a controller configured to generating a bearer resource modification reject message with a cause value, in response to a bearer resource modification request message received from the UE; and a transmitter configured to transmit, to the UE, the bearer resource modification reject message with the cause value, wherein an evolved packet system (EPS) bearer context information is deactivated based on the cause value.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein achieve a method implemented in a User Equipment (UE). The method includes receiving a bearer resource modification reject message from a Mobility Management Entity (MME) with a cause value in response to a bearer resource modification request message sent to the MME. The method further includes deactivating an Evolved Packet System (EPS) bearer context locally in response to the bearer resource modification reject message.

In an embodiment, the method further includes transmitting a Tracking Area Update (TAU) request message with the EPS bearer context status to the MME to synchronize the EPS bearer context with the MME.

In an embodiment, the cause value refers to an EPS Session Management (ESM) cause value that indicates request rejected, unspecified.

Consider the scenario: if the UE transmit the bearer resource modification request message to the network in order to release all the resources in the bearer, the network would normally respond by initiating a deactivation procedure for the bearer, but the network transmits a bearer resource modification reject message along with cause #31. The cause #31 corresponds to the ESM cause value #31 "request rejected, unspecified". After receiving the bearer resource modification reject message along with the cause #31 by the UE, the UE deactivates the EPS bearer context locally without peer-to-peer signaling between the UE and the MME in the network. In order to synchronize the EPS bearer context status with the MME, the UE transmits the TAU request message that includes the EPS bearer context status Information Element (IE) to the MME.

Unlike the conventional methods, the proposed method minimizes the wastage of resources on the UE side and ensures quicker synchronization of bearer states on the UE and the network. This results in providing a better user experience. The method handles a bearer resource release from the UE side. The proposed method is easy to implement on the UE without any modification in the network. The method handles Traffic Flow Template (TFT) conflict scenarios in a video call and an audio call.

The method avoids a call mute issue, if the bearer is related to the audio call. The method avoids a screen blank issue, if the bearer is related to the video call. The method avoids a data stall problem with respect to the bearer for which the UE has deleted all TFT packet filters.

Referring now to the drawing, and more particularly to FIGS. 1-6, there are shown preferred embodiments.

Figure 1:
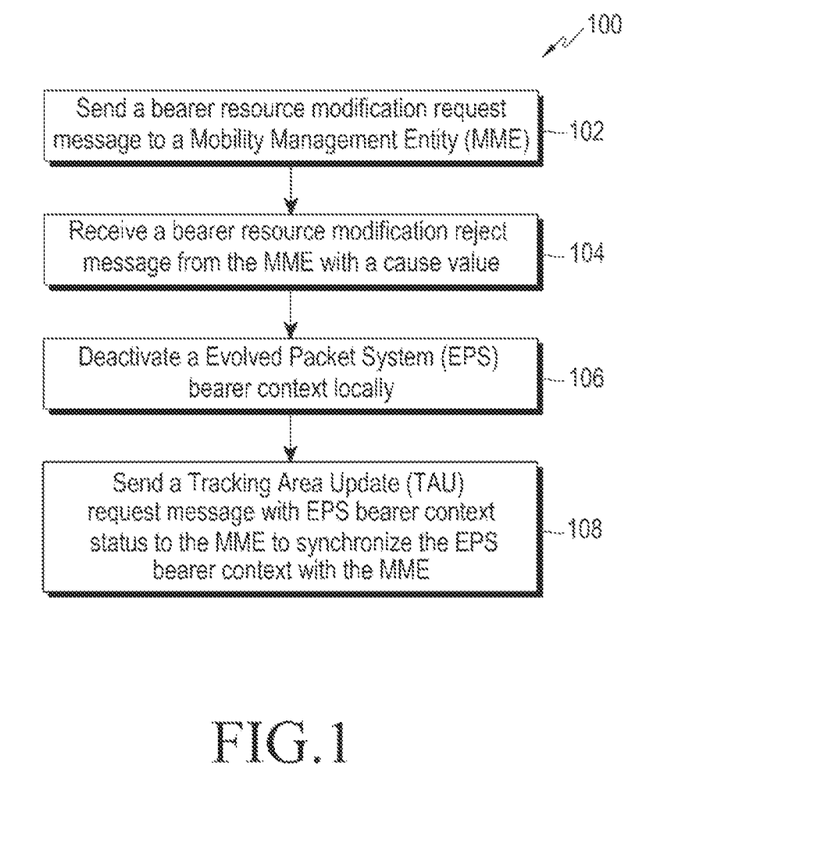
FIG. 1 is a flow diagram illustrating a method of deactivating an Evolved Packet System (EPS) bearer context locally when a User Equipment (UE) receives a bearer resource modification reject message from a network, according to the embodiments as disclosed herein.

FIG. 1 is a flow diagram illustrating a method 100 for deactivating the EPS bearer context locally when the UE receives the bearer resource modification reject message from the network, according to the embodiments as disclosed herein. The steps 102 to 108 are performed by a processor (e.g. microprocessor, microcontroller, or the like) of the UE. The UE can be, for example but not limited to, a cellular phone, a smart phone, a mobile phone, a tablet, a laptop, a Personal Digital Assistant (PDA), or the like.

At step 102, the method 100 includes transmitting the bearer resource modification request message to the MME. At step 104, the method 100 includes receiving the bearer resource modification reject message from the MME with the cause value.

In an embodiment, the cause value refers to the ESM cause value that indicates request rejected, unspecified.

In an example, the cause value is ESM cause value #31.

At step 106, the method 100 includes deactivating the EPS bearer context locally. At step 108, the method 100 includes transmitting the TAU request message with the EPS bearer context status to the MME to synchronize the EPS bearer context with the MME.

The proposed method 100 minimizes the wastage of resources on the UE side and ensures quicker synchronization of bearer states on the UE and the network side. This results in providing the better user experience. The proposed method 100 is easy to implement on the UE without any modification in the network. The method 100 handles the bearer resource release from the UE side. The method 100 handles the TFT conflict scenarios during the voice call and the audio call.

Consider an example, if the user of the UE initiate's a Voice over Long Term Evolution (VoLTE) audio call, the network assigns the dedicated bearer for the audio which includes packet filters for the audio. The UE upgrades the audio call to a video call. After upgrading the audio call to the video call, the network assigns dedicated bearer for the video which includes the packet filter for the video. Due to some changes on the network side, the network transmits the bearer resource modification request message for the audio bearer (includes new set of packet filters for the audio) to the UE. However, the packets received as part of bearer resource modification request message for the audio bearer has conflict (i.e., packet filter mismatch) with existing packet filters assigned for the video bearer. In such case, as per 3GPP specification, the UE accepts newly received packet filters and deletes the existing packet filters of the video bearer. The UE informs the same to the network through the bearer resource modification request with the OP CODE set as DELETE for the video bearer. If the network rejects the bearer resource modification request, the UE deactivates the EPS bearer context locally without peer-to-peer signaling between the UE and the network. Further, in order to synchronize the EPS bearer context status with the MME, the UE transmits the TAU request message that includes the EPS bearer context status to the network. Thus, this example results in avoiding the call mute issue and improving the user experience.

Consider another example: if the user of the UE initiates the VoLTE audio call. The network assigns dedicated bearer for the audio which includes packet filters for the audio. The UE upgrades the audio call to the video call. The network assigns the dedicated bearer for the video which includes the packet filter for the video. Due to some changes on the network side, the network transmits the bearer resource modification request for the video bearer which includes new set of packet filters for the video. However, the packets received as part of bearer resource modification request for the video bearer has conflict (i.e., packet filter mismatch) with existing packet filters assigned for the audio bearer. In such case, as per 3GPP specification, the UE accepts the newly received packet filters and deletes the existing packet filters of the audio bearer. The UE informs the same to the network through the bearer resource modification request message with the OP CODE set as DELETE for the audio bearer. If the networks transmits the bearer resource modification reject message to the UE, the UE deactivates the EPS bearer context locally without peer-to-peer signaling between the UE and the network. Further, in order to synchronize the EPS bearer context status with the network, the UE transmits the TAU request message that includes the EPS bearer context status to the network. Thus, this example results in improving the user experience.

Consider another example: an Application "A" requests required Quality of Service (QoS) and the network assigns dedicated bearer for the Application "A". Application "B" also requests required QoS, and the network assigns the dedicated bearer for the Application "B". Due to some changes on the network side, the network transmits the bearer resource modification request for the Application "B" which includes new set of packet filters for the Application "A". However, the packets received as part of the bearer resource modification request for the Application "A" has conflict (i.e., packet filter mismatch) with existing the packet filters assigned for the Application "A". In such case, as per 3GPP specification, the UE accepts newly received packet filters and deletes the existing packet filters of the Application "A". The UE informs the same to the network through the bearer resource modification request with OP CODE set as DELETE for the audio bearer. If the network transmits the bearer resource modification reject message to the UE, the UE deactivates the EPS bearer context locally without peer-to-peer signaling between the UE and the network. Further, in order to synchronize the EPS bearer context status with the network, the UE transmits the TAU request message that includes the EPS bearer context status to the network. This results in improving the user experience.

The various actions, acts, blocks, steps, or the like in the method 100 may be performed in the order presented, in a different order or simultaneously. Further, in some embodiments, some of the actions, acts, blocks, steps, or the like may be omitted, added, modified, skipped, or the like without departing from the scope of the disclosure.

FIGS. 2 to 6 are sequence diagrams illustrating a step by step procedure in deactivating the EPS bearer context locally when the UE 102 receives the bearer resource modification reject message from the network 104, according to the embodiments as disclosed herein.

Figure 2:
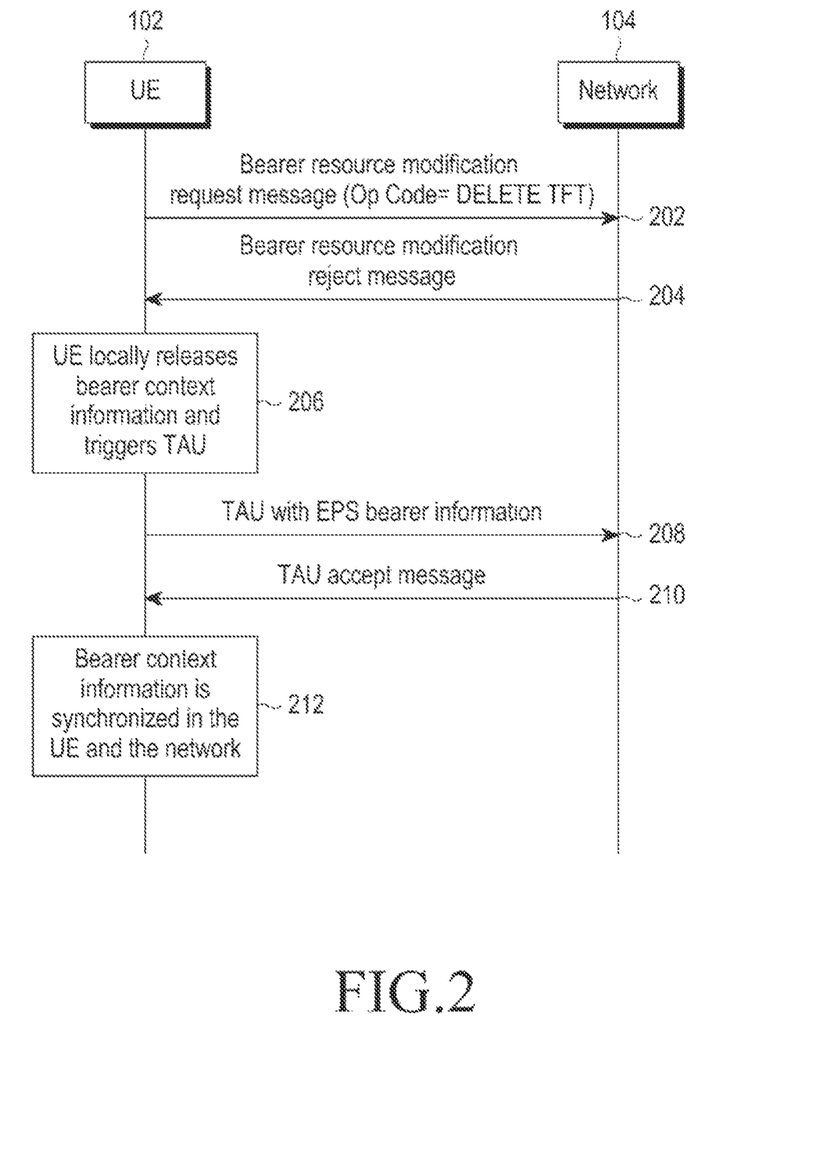
FIGS. 2 to 6 are sequence diagrams illustrating step by step procedure in deactivating an EPS bearer context locally when a UE receives a bearer resource modification reject message from a network, according to the embodiments as disclosed herein.

As shown in the FIG. 2, the UE 102 transmits (202) the bearer resource modification request message to the network 104. In an embodiment, the bearer resource modification request message includes the Op Code containing the DELETE TFT. The network transmits (204) the bearer resource modification reject message to the UE 102. Based on the bearer resource modification reject message, the UE 102 locally releases (206) the bearer context information and triggers the TAU procedure. Further, the UE 102 transmits (208) the TAU with the EPS bearer information to the network 104. The network 104 transmits (210) the TAU accept response message to the UE 102. Based on the TAU accept response message, the bearer context information is synchronized (212) in the UE 102 and the network 104.

In an embodiment, the bearer information indicates to the network 104 about the bearer that the UE 102 released locally (inactive) and the bearer that is still active in the UE 102.

In an example, the UE 102 releases the audio bearer locally and retains the video bearer. The EPS bearer information indicates to the network 104 that the inactive audio bearer and the active video bearer.

Figure 3:
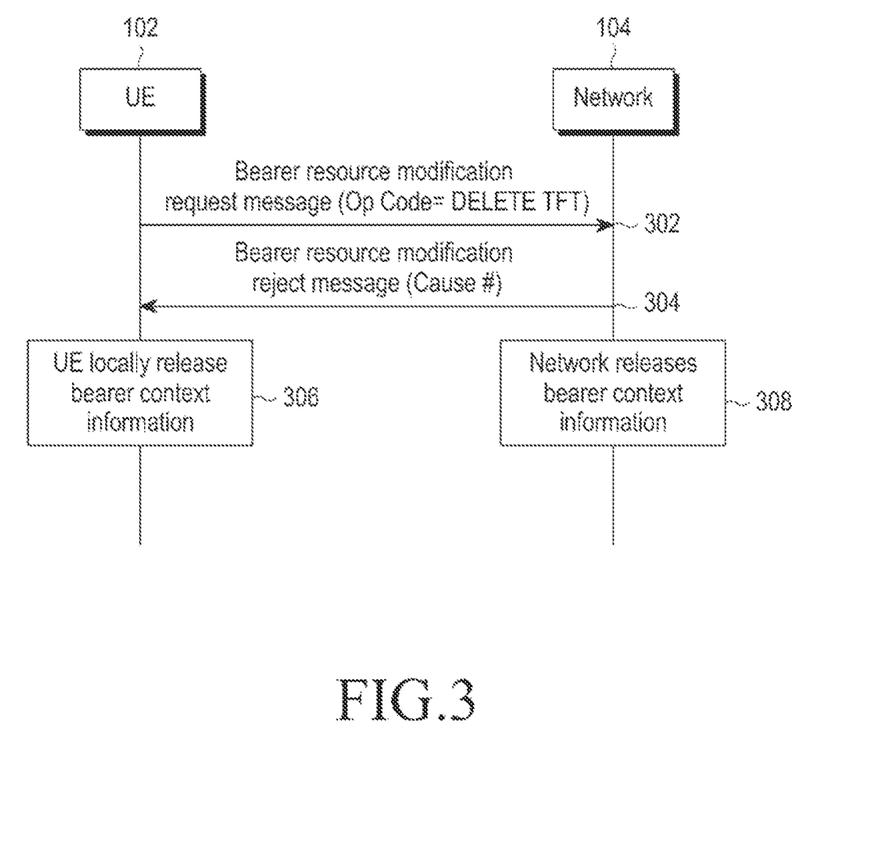

As shown in the FIG. 3, the UE 102 transmits (302) the bearer resource modification request message to the network 104. In an embodiment, the bearer resource modification request message includes the Op Code with the DELETE TFT. The network transmits (304) the bearer resource modification reject message along with the cause value to the UE 102. In an embodiment, the cause value refers to the ESM cause value that indicates the request rejected, unspecified status. In an example, the cause value is ESM cause value #31. Based on the bearer resource modification reject message along with the cause value, the UE 102 locally releases (306) the bearer context information. The network 104 locally releases (308) the bearer context information.

In an embodiment, the network 104 locally releases the bearer context information first and then UE 102 locally releases the bearer context information.

In an embodiment, the bearer context information indicates to the network 104 about the bearer that the UE 102 released locally (inactive) and the bearer that is still active in the UE 102.

In an example, the UE 102 releases the audio bearer locally and retains the video bearer. The EPS bearer information indicates to the network 104 that the inactive audio bearer and the active video bearer.

Figure 4:
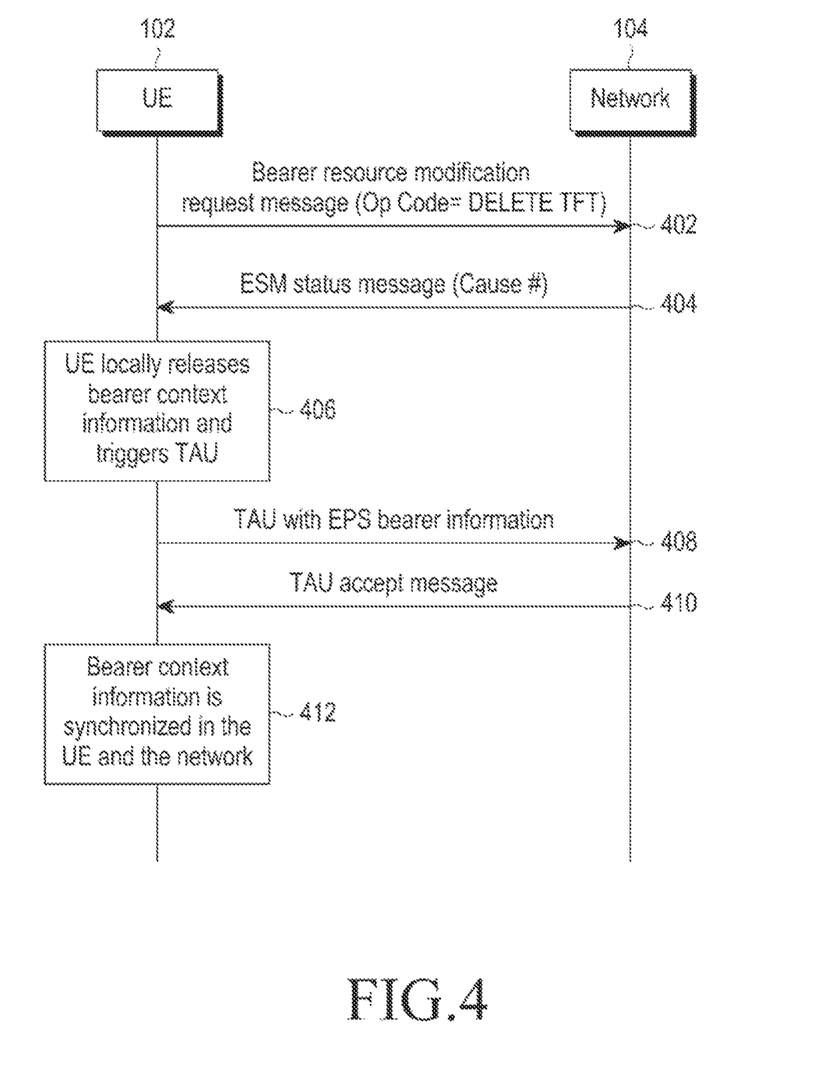

As shown in the FIG. 4, the UE 102 transmits (402) the bearer resource modification request message to the network 104. In an embodiment, the bearer resource modification request message includes the Op Code containing the DELETE TFT. The network transmits (404) the ESM status message along with the cause value to the UE 102. In an embodiment, the cause value refers to the ESM cause value that indicates the request rejected, unspecified status. In an example, the cause value is ESM cause value #31. Based on the ESM status message along with the cause value, the UE 102 locally releases (406) the bearer context information and triggers the TAU procedure. Further, the UE 102 transmits (408) the TAU with the EPS bearer information to the network 104. The network 104 transmits (410) the TAU accept response message to the UE 102. Based on the TAU accept response message, the bearer context information is synchronized (412) in the UE 102 and the network 104.

In an embodiment, the bearer context information indicates to the network 104 about the bearer that the UE 102 released locally (inactive) and the bearer that is still active in the UE 102.

In an example, the UE 102 releases the video bearer locally and retains the video bearer. The EPS bearer information indicates to the network 104 that the inactive video bearer and the active video bearer.

Figure 5:
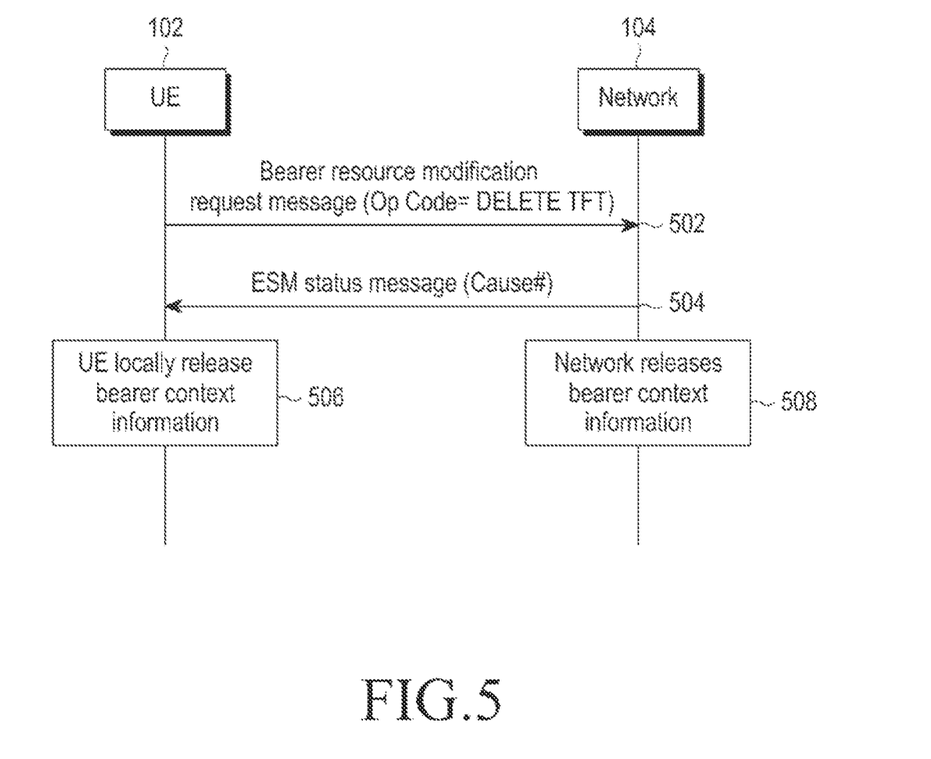

As shown in the FIG. 5, The UE 102 transmits (502) the bearer resource modification request message to the network 104. In an embodiment, the bearer resource modification request message includes the Op Code containing the DELETE TFT. The network transmits (504) the ESM status message along with the cause value to the UE 102. In an embodiment, the cause value refers to the ESM cause value that indicates the request rejected, unspecified status. In an example, the cause value is ESM cause value #31. Based on the ESM status message along with the cause value, the UE 102 locally releases (506) the bearer context information. The network 104 locally releases (508) the bearer context information.

In an embodiment, the network 104 locally releases the bearer context information first and then the UE 102 second locally releases the bearer context information.

In an embodiment, the bearer context information indicates to the network 104 about the bearer that the UE 102 released locally (inactive) and the bearer that is still active in the UE 102.

In an example, the UE 102 releases the audio bearer locally and retains the video bearer. The EPS bearer information indicates to the network 104 that the inactive audio bearer and the active video bearer.

Figure 6:
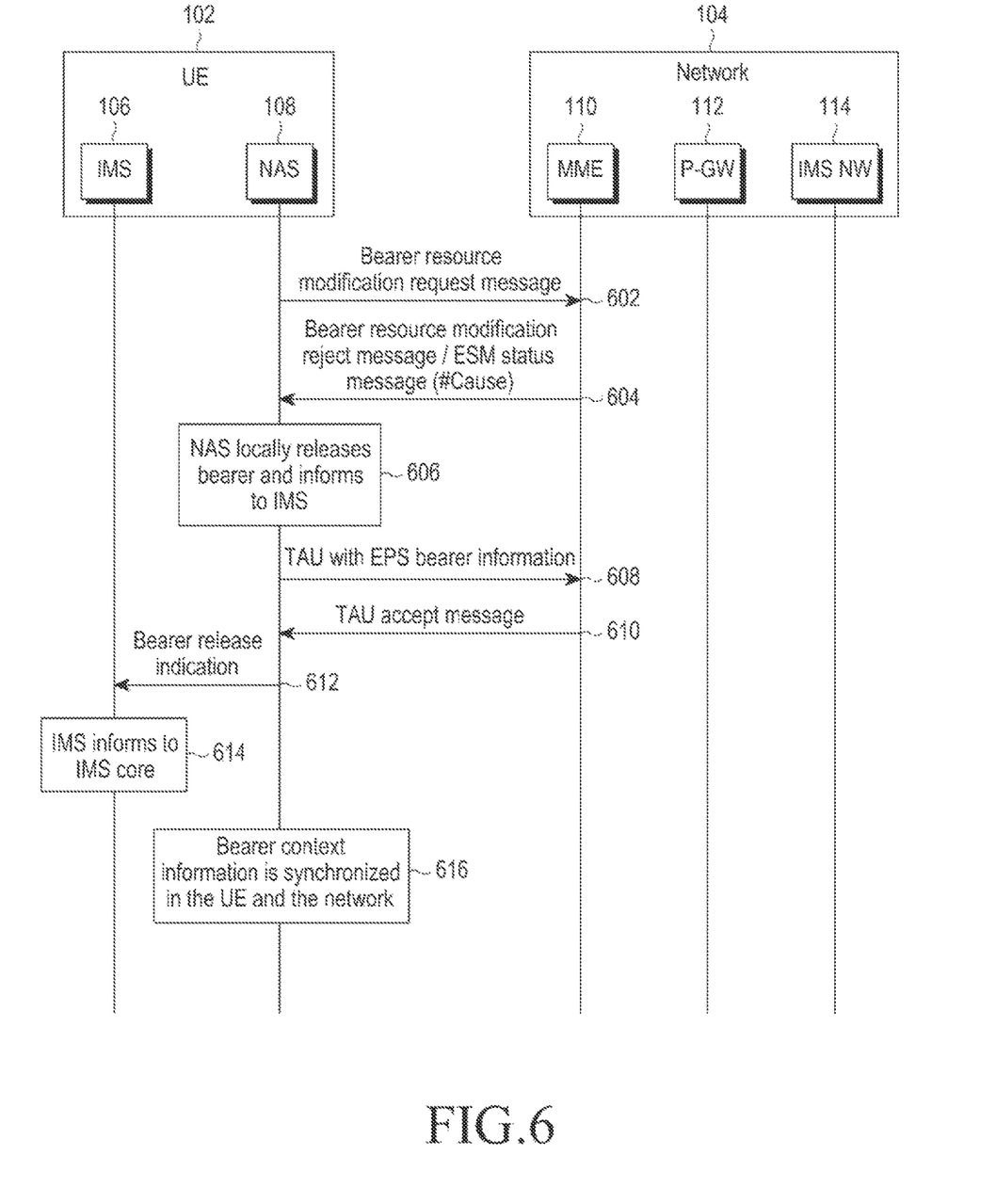

As shown in the FIG. 6, in an embodiment, the UE 102 includes an IMS client 106 and a Non-Access Stratum (NAS) layer 108. In an embodiment, the network 104 includes the MME 110, a Primary Gateway (P-GW) 112, and IMS NW 114. The NAS layer 108 transmits (602) the bearer resource modification request message to the MME 110. The MME 100 transmits (604) the bearer resource modification reject message or the ESM status message along with the cause value to the NAS layer 108. In an embodiment, the cause value refers to the ESM cause value that indicates the request rejected, unspecified status. In an example, the cause value is ESM cause value #31. After receiving the bearer resource modification reject message or the ESM status message along with the cause value by the NAS layer 108, the NAS layer 108 locally releases (606) the bearer and informs to the IMS client 106. Further, the NAS layer 108 transmits (608) the TAU with the EPS bearer information to the MME 110. The MME 110 transmits (610) the TAU accept message to the NAS layer 108. After receiving the TAU accept message by the NAS layer 108, the NAS layer 108 transmits (612) the bearer release indication to the IMS client 106. The IMS client 106 informs (614) corresponding to the bearer release indication to an IMS core. Further, the bearer context information is synchronized (616) with the UE 102 and the network 104.

In an example, when the UE 102 initiated modification for the video bearer is rejected by a Long Term Evolution (LTE) network. When the UE 102 initiates modification to delete the video bearer, then the video call will indicate release of the video bearer. Further, the UE 102 deletes the packet filters and inform to the IMS client 106. The IMS client 106 transmits a RE-INVITE to the LTE network for downgrading the video call to the voice call. This will trigger the network 104 to initiate a graceful release the video bearer. This avoids a scenario where the user would have seen a blank screen with only the voice ongoing for the video call.

In another example, when the UE 102 initiated modification for the audio bearer is rejected by the LTE-Advanced (LTE-A) network 104. The modem will indicate the release of the audio bearer to the IMS client, after the deletion of the packet filter. The UE 102 transmits a BYE to the LTE-A network for disconnecting the call. This will again result in immediate synchronization of the bearer on the UE 102 and LTE-A network sides, since the LTE-A network initiates release of the audio bearer. This also avoids a scenario where the call would have been dropped due to a Real-time Transport Protocol (RTP) time-out.

Although exemplary embodiments of the present disclosure have been described in detail hereinabove, it should be understood that many variations and modifications of the basic inventive concept herein described, which may be apparent to those skilled in the art, will still fall within the spirit and scope of the exemplary embodiments of the present disclosure.

The embodiments disclosed herein can be implemented through at least one software program running on at least one hardware device and performing network management functions to control the elements. The elements shown in the FIGS. 1 to 6 include blocks, elements, actions, acts, steps, or the like which can be at least one of a hardware device, or a combination of hardware device and software module.

Figure 7:
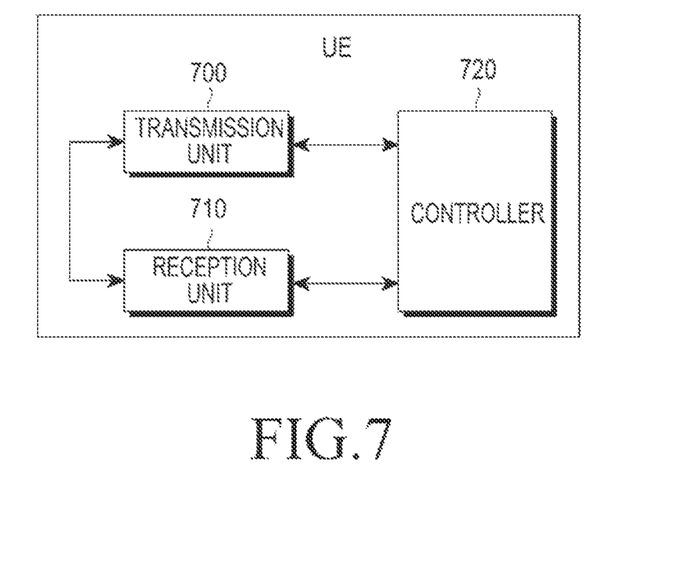
FIG. 7 is illustrating the UE apparatus according to an exemplary embodiment of the present disclosure.

FIG. 7 is illustrating the UE apparatus according to an exemplary embodiment of the present disclosure.

Referring to FIG. 7, the UE includes transmission unit 700 (e.g., a transmitter), reception unit 710 (e.g., a receiver), and controller 720. The transmission unit 700 and reception unit 710 respectively include a transmission module and a reception module for communicating with the network according to an exemplary embodiment of the present disclosure. The reception unit 710 receives the bearer resource modification reject message with a cause value from the network.

The controller 720 locally deactivates an evolved packet system (EPS) bearer context information in response to the bearer resource modification request message.

The transmission unit 700 transmits the TAU request message with EPS bearer context status to the MME to synchronize the EPS bearer context with the MME.

Figure 8:
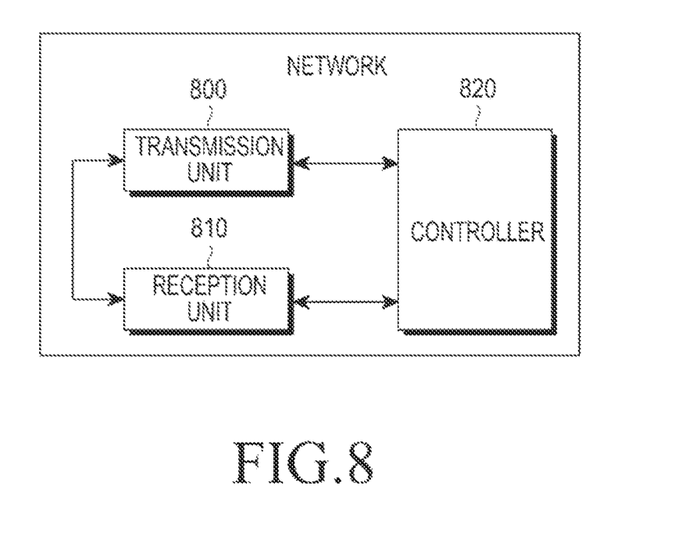
FIG. 8 is illustrating the network apparatus according to an exemplary embodiment of the present disclosure.

FIG. 8 is illustrating the network apparatus according to an exemplary embodiment of the present disclosure.

Referring to FIG. 8, the network includes transmission unit 800 (e.g., a transmitter), reception unit 810 (e.g., a receiver), and controller 820. The transmission unit 800 and reception unit 810 respectively include a transmission module and a reception module for communicating with the UE according to an exemplary embodiment of the present disclosure. For example, the transmission unit 800 transmits the bearer resource modification reject message with a cause value to the UE.

The controller 820 generates the bearer resource modification reject message with a cause value.

The reception unit 810 receives the bearer resource modification request message including the cause value from the UE.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for a user equipment (UE), the method comprising:
    after initiating a procedure for releasing all traffic flows for a bearer, receiving, from a mobility management entity (MME), a bearer resource modification reject message with a cause value;
    deactivating an evolved packet system (EPS) bearer context locally without peer-to-peer signaling between the UE and the MME, in response to receiving the bearer resource modification reject message; and
    transmitting, to the MME, a tracking area update (TAU) request message including an EPS bearer context status information element (IE) to synchronize an EPS bearer context status with the MME,
    wherein the cause value indicates that a request related to a bearer resource is rejected due to an unspecified reason.

2. The method of claim 1, wherein the EPS bearer context status is synchronized in the UE and the MME.

3. The method of claim 1, wherein the EPS bearer context status IE indicates that at least one EPS bearer context is active within the UE.

4. An apparatus for a user equipment (UE), the apparatus comprising:
    a transceiver; and
    at least one processor coupled to the transceiver,
    wherein the at least one processor is configured to:
        after initiating a procedure for releasing all traffic flows for a bearer, receive, from a mobility management entity (MME), a bearer resource modification reject message with a cause value,
        deactivate an evolved packet system (EPS) bearer context locally without peer-to-peer signaling between the UE and the MME, in response to receiving the bearer resource modification reject message, and
        transmit, to the MME, a tracking area update (TAU) request message including an EPS bearer context status information element (IE) to synchronize an EPS bearer context status with the MME, and
    wherein the cause value indicates that a request related to a bearer resource is rejected due to an unspecified reason.

5. The apparatus of claim 4, wherein the EPS bearer context status is synchronized in the UE and the MME.

6. The apparatus of claim 4, wherein the EPS bearer context status IE indicates that at least one EPS bearer context is active within the UE.

7. A method for a mobility management entity (MME), the method comprising:
    after a procedure for releasing all traffic flows for a bearer initiated by a user equipment (UE), transmitting, to the UE, a bearer resource modification reject message with a cause value; and
    receiving, from the UE which deactivated an evolved packet system (EPS) bearer context locally without peer-to-peer signaling between the UE and the MME, a tracking area update (TAU) request message including an EPS bearer context status information element (IE) to synchronize an EPS bearer context status with the MME,
    wherein the cause value indicates that a request related to a bearer resource is rejected due to an unspecified reason.

8. The method of claim 7, wherein the EPS bearer context status is synchronized in the UE and the MME.

9. The method of claim 7, wherein the EPS bearer context status IE indicates that at least one EPS bearer context is active within the UE.

10. The method of claim 7, further comprising:
    transmitting, to the UE, a TAU accept message to accept a synchronization of the EPS bearer context status with the UE.

11. An apparatus for a mobility management entity (MME), the apparatus comprising:
    a transceiver; and
    at least one processor coupled to the transceiver,
    wherein the at least one processor is configured to:
        after a procedure for releasing all traffic flows for a bearer initiated by a user equipment (UE), transmit, to the UE, a bearer resource modification reject message with a cause value, and
        receive, from the UE which deactivated an evolved packet system (EPS) bearer context without peer-to-peer signaling between the UE and the MME, a tracking area update (TAU) request message including an EPS bearer context status information element (IE) to synchronize an EPS bearer context status with the MME, and
    wherein the cause value indicates that a request related to a bearer resource is rejected due to an unspecified reason.

12. The apparatus of claim 11, wherein the EPS bearer context status is synchronized in the UE and the MME.

13. The apparatus of claim 11, wherein the EPS bearer context status IE indicates that at least one EPS bearer context is active within the UE.

14. The apparatus of claim 11, wherein the at least one processor is further configured to:
    transmit, to the UE, a TAU accept message to accept a synchronization of the EPS bearer context status with the UE.

* * * * *